March 10, 1970     D. S. SHERARD     3,499,538
HOT DOG HOLDER
Filed Dec. 13, 1967     2 Sheets-Sheet 1
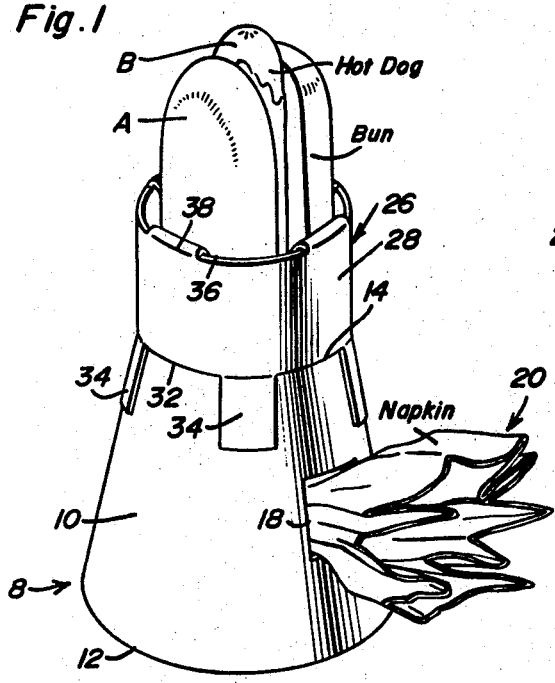
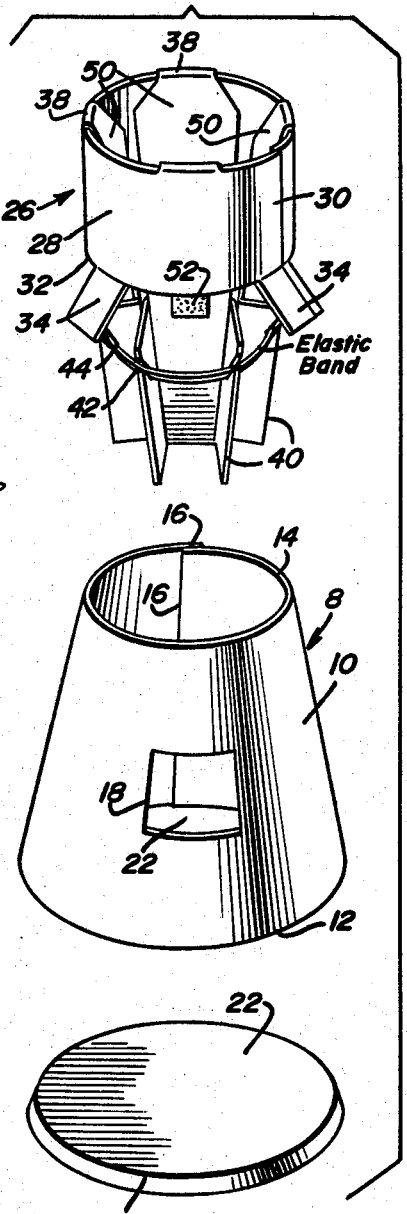
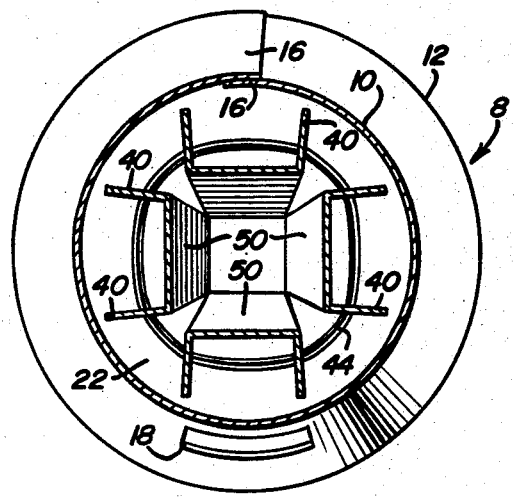
David S. Sherard
INVENTOR.
BY March 10, 1970  D. S. SHERARD  3,499,538
HOT DOG HOLDER
Filed Dec. 13, 1967  2 Sheets-Sheet 2
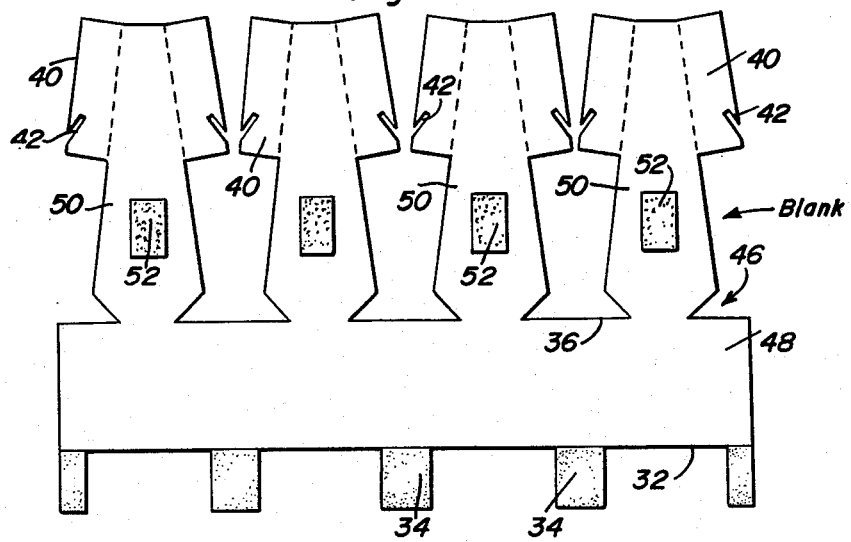
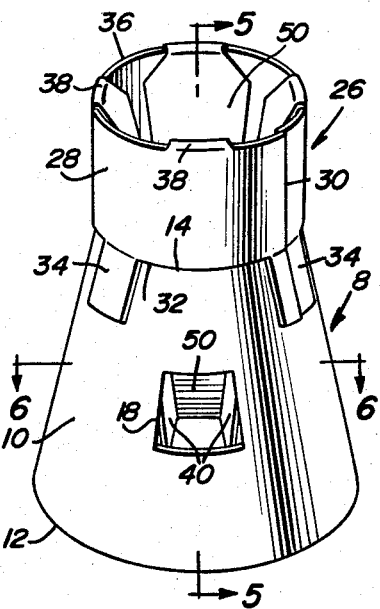
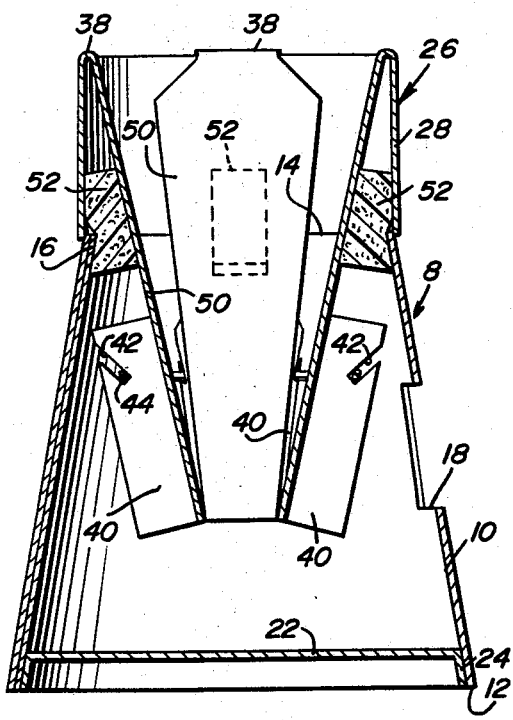
David S. Sherard
INVENTOR.

United States Patent Office

3,499,538
Patented Mar. 10, 1970

3,499,538
HOT DOG HOLDER
David S. Sherard, 933 N. Congress St.,
Jackson, Miss. 39202
Filed Dec. 13, 1967, Ser. No. 690,332
Int. Cl. A47f 7/00; B65d 3/00
U.S. Cl. 211—13                                    10 Claims

ABSTRACT OF THE DISCLOSURE

For use in restaurants, at lunch counters and the like, a server and holder for a hot dog. It is characterized by a closed-bottom self-standing cup-like hollow base whose hollow portion provides a receptacle capable of trapping surplus mustard, catsup, juices and drippings in a manner to keep the same from trickling on the user's hands or clothing. The base supports a receiver having bun clasping fingers depending into the receptacle portion. An opening in the side wall of the base permits a usable napkin to be stuffed therein.

---

This invention relates to a server and holder for a sandwich, for example, a hot dog on a finger roll or bun, and has to do with an adaptation which is adapted to meet the purposes of waiters and waitresses and, more significantly, the needs of unwary customers seated at tables, at quick lunch counters, in parked automobiles and so on. It is sanitary, virtually leakproof and in keeping with prevailing serving practice in that the component parts are made of economical disposable wax-paper, liquid resistant foldable sheet material, plastic sheet or equivalent throw-away material, as may be desired.

A general object of the instant invention is to improve, structurally and functionally, on sandwich holding and serving devices such as cardboard and equivalent tray-type holders currently in use in many restaurants and on prior patented adaptations, for example, the sandwich holder disclosed in the patent to Lynn, 2,892,719, and, in so doing, to provide a server and holder which well serves the purposes for which it has been devised.

Briefly, the server and holder herein disclosed is preferably made up of two principal component parts, namely, a hollow self-standing cup-like base, and a complemental attachment for the upper open end thereof wherein said attachment is constructed to provide a novel and distinctive holder into which the lower half-portion, more or less, of the sandwich is telescopingly but removably fitted and retained.

One improvement has to do with the base. This is preferably in the form of a truncated conical hollow cup whose bottom is closed and self-standing and whose truncated upper end is open for reception and retention of the companion holder unit. The hollow portion of the base provides a receptacle which functions to trap surplus mustard, catsup, juices and drippings in a manner that the user's hands will be kept clean and soilage of the garments will be satisfactorily prevented.

Another improvement resides in providing a median sidewall portion of the cup-like base with an appropriate opening which leads into the receptacle and which lends itself to use as a practical retainer for an insertable and removable napkin.

A further improvement resides in the adoption and use of a cut-out blank of suitable disposable sheet material which is characterized by an elongated strip member provided along one lengthwise edge with gummed attaching and retaining tabs and provided along the other longitudinal edge with spaced projecting suitably shaped flexible flaps. These flaps are fashioned into bun embracing and retaining fingers and have properly paired and notched flanges wherein the notches provide keeper seats for an elastic band and wherein the flanges provide reinforcing elements for the fingers on which they are mounted.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a dual purpose server and holder constructed in accordance with the present invention and showing the manner in which it is constructed and intended to be used.

FIG. 2 is an exploded perspective view showing the primary component parts and how they are constructed and arranged to be assembled for use.

FIG. 3 is a top plan view of the sheet material cut-out blank from which the receiver in FIG. 2 is constructed.

FIG. 4 is a view in perspective similar to FIG. 1 but with the napkin and sandwich removed.

FIG. 5 is an enlarged central vertical sectional view taken on the plane of the vertical section line 5—5 of FIG. 4.

And FIG. 6 is a suitably enlarged section taken on the horizontal section line 6—6 of FIG. 4.

Referring now to the views of the drawings, it will be noted that the aforementioned hollow vertically elongated cup-like base is denoted by the numeral 8. It is preferably of truncated conical form and the body portion is made from a length of suitable disposable sheet material. This body portion is denoted in FIG. 2. by the numeral 10 and has a flaring bottom edge 12 and an upper reduced or truncated end 14. The edge portions of the sheet or body are denoted at 16 and are overlapped and suitably secured together. This body portion is provided in one side with a hole 18 of appropriate size and shape to accommodatingly receive an insertable and removable paper napkin 20 in the manner illustrated in FIG. 1. The lower portion of the body is closed by a permanently attached disk-like bottom 22 which is fitted in place and secured by the marginal attaching flange 24. The bottom wall 22 is considered here as an integral part of the hollow cup-like base 8.

The companion and complemental unit is denoted by the numeral 26 and it too is made from suitable disposable sheet material and comprises a ring-like collar 28 having end portions 30 overlapped and adhesively or otherwise joined together. The diameter of the collar is such that it cooperates conformingly with the upper edge portion 14 of the hollow base. The lower edge portion 32 of the collar is provided with circumferentially spaced projecting tabs 34 which are suitably gummed and are folded down and attached to the upper exterior edge portion of the base in the manner shown with particularity in FIGS. 1 and 4. The upper marginal edge 36 is provided with inwardly and downwardly turned component portions which nest themselves within the collar and also depend into the receptacle or hollow portion of the base. More specifically the upper edge is provided with a plurality of elongated flexible suitably spaced parallel coplanar flaps which are of the marginal shape shown in FIG. 3. These flaps provide suitably flexible fingers whose upper ends 38 are bent and connected with the upper edge 36 at circumferentially spaced points. The fingers depend below the bottom edge of the collar and telescope into the receptacle portion of the hollow base in the manner illustrated. The lower end of each finger is provided with a pair of spaced parallel relatively short reinforcing flaps 40 and these flaps in turn are provided with open-ended keeper notches 42 to accommodate an insertable and removable elastic band 44 which is of sufficient tension to cause the fingers to incline toward each other and to provide the desired bun receiver.

As is evident from the illustration in FIG. 3 the overall blank is denoted by the numeral 46 and that part which provides the collar comprises an elongated rectangular strip 48 which is bent upon itself between its ends and fashioned into a ring-like collar by merely overlapping and securing the ends together as shown at 30 in FIG. 2. The only other feature to be referred to here and also in FIG. 5 is that the median portion 50 of each finger is provided with a compressibly resilient rectangular spacing and cushioning block 52. It follows that when the finger-forming flaps are bent down and within the surrounding confines of the collar the cushioning blocks then come into play in the manner shown with particularity in FIG. 5. This is to say the blocks bridge the coacting edges 32 and 14 when the edges are brought together in assembled relationship. Accordingly, the blocks assist in inclining the fingers inwardly and downwardly and also assist in positioning the converging lower free ends in the coacting relationship shown in FIG. 5.

It is believed that the construction of the blank from which the receiver 26 is constructed is clear in FIG. 3, that the manner in which the tabs 34 and flaps are bent to cooperate with each other is clearly brought out in the upper portion of FIG. 2. It is evident that when the receiver 26 is assembled atop the hollow base 8 the parts then cooperate in providing the ready-to-use product illustrated in FIG. 4. When the device is in use the lower half-portion of the sandwich is fitted telescopingly into the receiver and is nested in place and in fact resiliently clasped by the encompassing fingers. This is to say, the fingers contact the bun or roll A and position anl retain the hot dog B in place therein. The napkin 20 which is usually employed is fitted into the receptacle of the base by way of the side opening 18. It follows that the ready-to-use assemblage is as clearly illustrated in FIG. 1.

It is believed that a careful consideration of the views of the drawing in conjunction with the detailed description thereof will enable the reader to obtain a clear understanding of the construction of the two principle component parts 8 and 26 as well as the ready-to-use blank 46 in FIG. 3. A more extended description is therefore believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling, within the scope of the invention.

What is claimed as new is as follows:

1. A server and holder for a sandwich comprising, a hollow cup-like base closed at its bottom and open at its top, the hollow portion of said base providing a receptacle capable of trapping drippings, means mounted atop said base and designed and adapted to receive and hold a ready-to-eat sandwich (hot dog and bun) above and in alignment with said receptacle, said base embodying a self-standing bottom capable of assuming a stay-put non-toppling position when seated on a table, counter or similar support surface, said base being provided in a side portion with an opening communicating with said receptacle, said opening being of a size and shape to permit a paper napkin to be removably lodged therein with an inner end portion projecting into said receptacle and an outer end portion projecting outwardly in a manner that it is accessible for withdrawal and convenient use.

2. The server and holder defined in and according to claim 1, and wherein said base and said holding and receiving means are made up of independent units, are capable of being put together and joined for coordinating use, and are made of economical disposable material.

3. A server and holder for a sandwich comprising, a hollow cup-like base closed at its bottom and open at its top, the hollow portion of said base providing a receptacle capable of trapping drippings, means mounted atop said base and designed and adapted to receive and hold a ready-to-eat sandwich (hot dog and bun) above and in alignment with said receptacle, said base embodying a self-standing bottom capable of assuming a stay-up non-toppling position when seated on a table, counter or similar support surface, said means comprising a receiver having a plurality of vertically elongated flaps, said flaps constituting bun embracing and holding fingers.

4. The server defined in and according to claim 3, and wherein said fingers are aranged at circumferentially spaced equidistant points and have free lower converging ends surrounded and grouped together by an elastic band.

5. For restaurant, lunch counter and similar use, a single use throw-away server and holder for a sandwich, for example, a hot dog on a bun, comprising, a hollow vertically elongated cup-like base closed at its bottom and open at its top, the hollow portion of said base providing a receptacle one function of which is to trap messy drippings such as surplus mustard, catsup, relish and the like, said base having a self-standing bottom and being unlikely to topple over unless by accident, a receiver comprising a collar aligned with and secured atop said base, said collar having upper and lower marginal edges, the lower marginal edge having depending attaching tabs attached to upper exterior surface portions of said base and securing said collar in cooperable alignment with the upper open end of said base, the upper marginal edge of said collar being provided with bun embracing and holding means.

6. The server and holder defined in and according to claim 5, and wherein said embracing and holding means comprises a plurality of circumferentially spaced vertically elongated fingers having upper ends joined to said upper edge and free lower depending ends nested within the encompassing confines of said receptacle.

7. The server and holder defined in and according to claim 5, and wherein said embracing and holding means comprises a plurality of circumferentially spaced vertically elongated fingers having upper ends joined to said upper edge and free lower depending ends nested within the encompassing confines of said receptacle, said lower ends converging and having paired laterally outwardly projecting reinforcing flanges having outwardly opening notches defining keeper seats, and an elastic band encircling said fingers and flanges and seated in said notches, said band being normally slightly tensioned and urging the respective fingers into yielding contact with coacting portions of said bun in a manner to suspend the same while not hampering step-by-step withdrawal as the sandwich is gradually withdrawn and consumed.

8. The server and holder defined in and according to claim 7, and wherein said base is provided in an accessible side portion with a prescribed opening in communication with said receptacle portion and available for use when a paper napkin is removably stuffed for retention in said opening.

9. The server and holder defined in and according to claim 7, and wherein the median outer surface portion of each finger is provided with a compressibly resilient spacing block, said blocks being interposed between said fingers and the surrounding wall portion of said base and said collar and engaging the upper edge of said base.

10. For use in conjunction with a hollow vertically elongated cup-like self-standing base closed at its bottom and open at its top and wherein the hollow portion of said base constitutes a receptacle portion: holding means for a sandwich, a hot dog on a bun for example, said means embodying a complemental receiver unit which when in use can be supported in cooperative alignment with said open top and receptacle portion, said receiver unit being such in construction and adaptability that it can be made from a cut-out sheet material blank embodying an elongated flexible strip member having ends which are adapted to be overlapped and joined to provide a ring-like collar, said strip having one lengthwise edge provided with longitudinally spaced outstanding gummed attaching and retaining tabs, the other lengthwise edge having longitudinally spaced elongated flaps, said flaps having free ends and constituting bun clasping fingers, and said free ends having notched reinforcing flanges on opposite longitudinal edges.

References Cited

UNITED STATES PATENTS

| | | |
|---|---|---|
| 2,329,512 | 9/1943 | Clifford. |
| 2,395,754 | 2/1946 | O'Neil et al. _____ 229—4.5X |
| 2,503,045 | 4/1950 | Hamilton. |
| 2,741,901 | 4/1956 | Silos _____ 211—13 |
| 2,982,458 | 5/1961 | Hennion. |
| 3,208,478 | 9/1965 | Baines. |

DAVID H. BROWN, Primary Examiner

U.S. Cl. X.R.

229—1.5, 4.5